United States Patent

[11] 3,594,991

| [72] | Inventors | Max Berz;<br>Wolfgang Berz, both of Bayerlandstrasse 7,<br>8113 Kochel am See, Germany |
|---|---|---|
| [21] | Appl. No. | 777,454 |
| [22] | Filed | Nov. 20, 1968 |
| [45] | Patented | July 27, 1971 |
| [32] | Priority | Nov. 22, 1967, Mar. 19, 1968 |
| [33] | | Germany |
| [31] | | P 16 07 671.4 and P 16 57 125.8<br>Continuation-in-part of application Ser. No.<br>491,670, Sept. 30, 1965, now abandoned. |

[54] APPARATUS FOR SEPARATING SUSPENDED SOLID PARTICLES FROM A CARRIER GAS
12 Claims, 6 Drawing Figs.

[52] U.S. Cl.................................................. 55/294,
55/302, 55/337, 55/432, 55/459, 55/474
[51] Int. Cl....................................................B01d 50/00
[50] Field of Search........................................55/96—98,
282, 284, 293, 291, 294, 297, 304, 337, 320, 418,
459, 474, 515, 512, 318—320, 432; 210/304,
269—280

[56] References Cited
UNITED STATES PATENTS

| 299,898 | 6/1884 | Wright | 34/181 |
|---|---|---|---|
| 585,568 | 6/1897 | Greiwe | 55/239 |
| 940,076 | 11/1909 | Seaver | 55/337 |
| 2,134,978 | 11/1938 | Marshall | 55/320 |
| 3,090,180 | 5/1963 | Berz et al. | 55/282 |
| 387,607 | 8/1888 | Trebaw | 210/273 |
| 506,879 | 10/1893 | Jewell | 210/279 |
| 575,824 | 1/1897 | Case | 55/282 |
| 650,611 | 5/1900 | Reeves | 210/277 |
| 879,963 | 2/1908 | Hirt | 210/274 |
| 3,057,137 | 10/1962 | Perlis et al. | 55/341 |

*Primary Examiner*—Frank W. Lutter
*Assistant Examiner*—Bernard Nozick
*Attorney*—Kelman and Berman ABSTRACT: A filter chamber is superimposed on the container of a cyclone collector and vertically divided into two compartments by a filter bed of particulate material. A gas stream carrying solid particles is admitted to the cyclone collector, stripped of a portion of the solids, and passed to the upper compartment of the filter chamber by a conduit which passes the top wall of the container, the lower filter compartment, and the filter bed. Residual solid particles are removed from the gas stream passing downward through the filter bed and released from the lower compartment. A rake permits the filter bed to be stirred during regeneration by a scavenging gas passed upwardly through the filter bed.

3,594,991

INVENTORS.
Max Berz
Wolfgang Berz
By: Low and Berman
AGENTS

APPARATUS FOR SEPARATING SUSPENDED SOLID PARTICLES FROM A CARRIER GAS

REFERENCE TO RELATED APPLICATION

This application is a continuation-in-part of our copending application Ser. No. 491,670, filed on Sept. 30, 1965 now abandoned.

BACKGROUND OF THE INVENTION

This invention relates to phase separation, and particularly to apparatus for separating solid particles from a carrier gas in which the particles are suspended.

Cyclone collectors and filters are commonly employed for stripping a contaminated gas stream of suspended particles, particularly solid particles. It has also been proposed to arrange a cyclone collector and a filter in series to remove coarser particles from the gas in the collector, and to retain residual fine particles in the filter. However, the flow resistance of the filter and of the conduit connecting the cyclone collector with the filter tends to interfere with operation of the cyclone collector in known devices, and the high flow velocity required in a centrifugal collector for high efficiency cannot be maintained unless the effective filter surface is much greater than the cross section of the vortex in the cyclone collector.

An important object of this invention is the provision of phase-separating apparatus of the type described in which a cyclone and a filter are combined to minimize their unfavorable interaction.

SUMMARY OF THE INVENTION

According to this invention a housing defining a filter chamber therein is superimposed on the container of the cyclone collector to which the gas stream to be purified is admitted through an inlet. A filter which extends horizontally through the filter chamber divides the same into upper and lower compartments. The passages in the filter which are pervious to the carrier gas of the stream and connect the compartments are dimensioned to retain the contaminating solid particles. The gas passes the filter in a downward direction from an exposed surface of the filter and is led outward from the lower compartment through a gas port.

The container of the cyclone collector and the upper compartment are connected by a straight conduit passing upward through the lower compartment and the filter into the upper compartment. Accumulated solid particles are discharged from the bottom of the cyclone collector container.

Other features, additional objects, and many of the attendant advantages of this invention will readily be appreciated from the following detailed description of preferred embodiments when considered jointly with the appended drawings.

DESCRIPTION OF THE PREFERRED EMBODIMENTS

Figure 1:
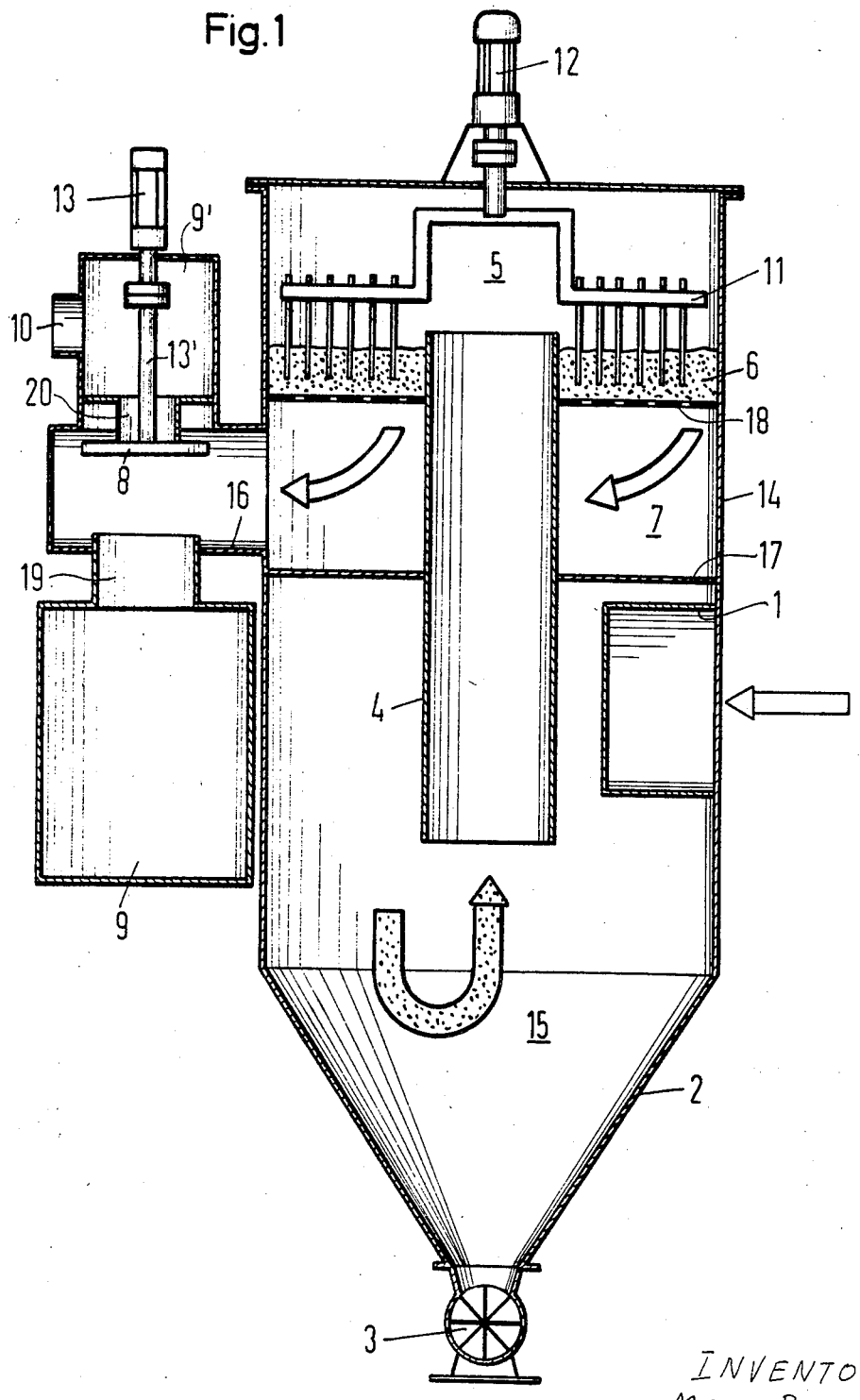
FIG. 1 shows a battery of phase-separating apparatus of the invention in elevational section, only one unit of the battery and connecting ductwork being seen.
Figure 2:
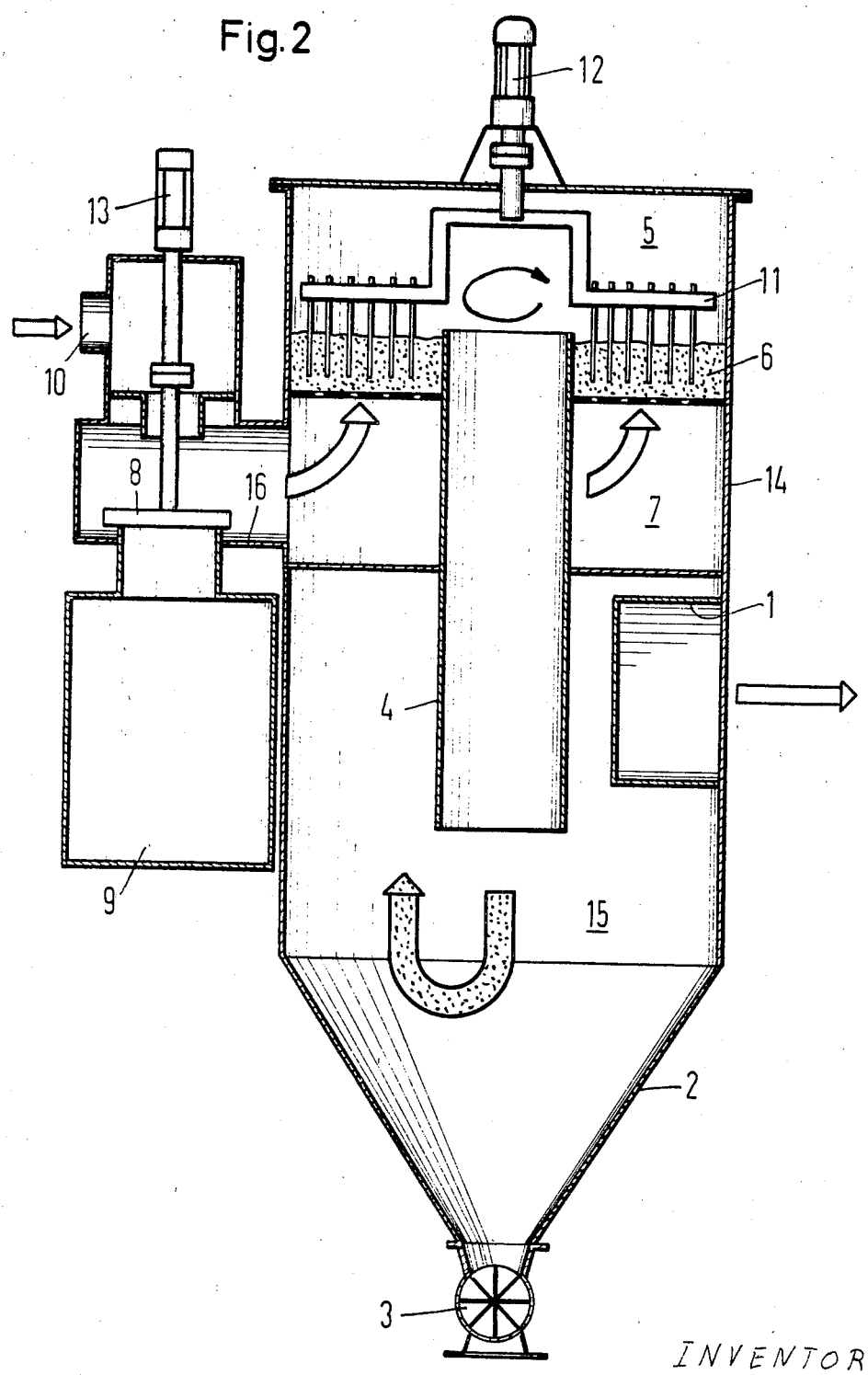
FIG. 2 illustrates the apparatus of FIG. 1 in a different operating position.

Referring initially to FIGS. 1 and 2, there is seen a sheet metal shell 14 having the shape of an upright cylinder provided with a conically tapering bottom 2. An inlet pipe 1 leads tangentially into the lower half of the cylindrical shell portion, and a screw conveyor 3 is attached to the apex portion of the conical bottom part 2.

A wide coaxial conduit 4 of circular cross section is mounted on the shell 14 by means of two horizontal partitions 17, 18 sealingly engaged by the conduit 4. The lower partition 17 forms the top wall of a container 15 for which the pipe 1 provides a gas inlet port well above the lower, axially directed orifice of the conduit 4. The upper partition 18 is perforated to form the foraminous supporting plate of a filter which also includes a layer 6 of sand or similar particulate material carried on the partition 18 and forming the exposed upper surface of the filter. The filter separates a cylindrical filter chamber in the shell 14 above the partition 17 into an upper compartment 5 and a lower compartment 7 downwardly bounded by the top wall 17 of the container 15.

A rake 11 is mounted in the compartment 5 on the vertical output shaft of an electric motor 12 supported on the top wall of the shell 14 outside the shell. The shaft passes through a nonillustrated seal into the shell cavity. The prongs of the rake 11 are made of heavy steel wire and extend vertically from the compartment 5 through the exposed filter surface into the layer 6. They move in horizontal circles through the layer 6 when the motor 12 is energized.

A gas port in the wall of the shell 14 which radially bounds the lower compartment 7 leads into a tube 16 provided with diametrically opposite valve seats constituted by rims of short coaxial tubes 19, 20 which lead from the tube 16 into parallel rectangular sheet metal ducts 9, 9'. The duct 9 is connected to apparatus which uses or stores the purified gas in a manner not shown, and the duct 9' is connected to a nonillustrated compressor by a conduit 10.

The disc member 8 of a lift valve is mounted on the piston rod 13' of a hydraulic jack 13. The jack cylinder is mounted atop the duct 9', and the piston rod 13' passes through the duct 9' and axially through the tube 20. The jack 13 permits the disc member 8 to be shifted between the positions of FIGS. 1 and 2 in which the valve seats on the tubes 19, 20 are sealed respectively.

As will be described hereinafter in more detail with reference to FIG. 6 and is not visible from FIGS. 1 and 2, the apparatus consists of several juxtaposed, identical shells 14 and the corresponding elements mounted in the shells, and the shells are connected to a common inlet manifold, the common screw conveyor 3, and the common ducts 9, 9' in the manner partly evident from FIGS. 1 and 2.

During normal operation, contaminated gas is introduced from the nonillustrated manifold into the container 15 whose cylindrical walls are so positioned relative to the tangential inlet pipe 1 as to deflect the entering gas stream into a vortex whose axis approximately coincides with the longitudinal axis of the conduit 4. The coarser solid particles in the stream are driven radially outward by centrifugal force against the shell 14, thereby separated from the carrier gas, slide along the wall into the conical bottom 2 of the cyclone collector which is mainly constituted by the inlet pipe 1 and the container 15, and are removed by the screw conveyor 3.

The carrier gas which is moved toward the center in an initially downwardly spiraling path enters the orifice of the conduit 4 and rises in the conduit 4 to the upper filter compartment 5 while still rotating about the axis of the shell 14. The gas discharged upwardly from the conduit 4 is caused by the walls of the compartment 5 to form one of two flow patterns or combinations of these patterns depending on dimensional features of the apparatus and the flow velocity of the gas.

If the circumferential component of gas flow predominates in the conduit 4, the gas in the chamber 5 flows in a spiraling path about the axis of the shell 14 and strikes the exposed surface of the layer 6 at an acute angle in a mainly tangential direction relative to the shell axis. If the gas flow in the conduit is predominantly axial, the gas is deflected by the top wall of the shell into an approximately toroidal pattern, and strikes the exposed surface of the layer 6 at an acute angle in a radial plane, the principal component of the gas flow at the point of impact being radially inward.

The effectiveness of the filter layer 6 at equal thickness is inversely proportional to the angle formed by the direction of movement of the impinging solid particles in the gas and the exposed filter surface. The thickness of the filter bed can be decreased without loss of filter efficiency when the angle between the entering gas and the filter surface is reduced, as by changing the dimensions of the apparatus or by modifying the velocity and direction of the contaminated gas stream entering the cyclone container 15.

The fine particles separated from the gas stream accumulate on the exposed filter surface. They are held down on the particulate filter medium of the layer 6 by the flowing gas and become themselves effective as a portion of the filter. If the permeability of the filter is reduced by an overly thick surface layer of fine particles, it can be restored by operating the rake 11 and mixing the fines with portions of the particulate material below the initial surface. The rake 11 also is effective in overcoming channeling in the layer 6 if it should occur.

The valve disc 8 is held by the jack 13 in the position shown in FIG. 1 during normal operation of the apparatus, so that the purified gas which downwardly emerges from the openings in the partition 18 flows into the duct 9 for further use or storage. The arrows in FIG. 1 indicate the direction of normal gas flow.

When the layer 6 is saturated with fine particles, the valve disc 8 is shifted into the position seen in FIG. 2, and a scavenging gas under high pressure is blown into the lower filter chamber 7, upwardly through the layer 6 into the compartment 5, and down through the conduit 4 into the container 15. The layer 6, in effect, is regenerated by gas classification. The heavier and coarser particles remain in the filter chamber, and the smaller and lighter particles are blown down into the container 15 where they are mostly collected in the conveyor 3. If so desired, the inlet pipe 1 may be disconnected from the aforementioned, nonillustrated manifold, and the scavenging gas may be either released to the atmosphere, or it may be further processed as needed.

It has been found advantageous to regenerate one separator in each battery while at least two other separators perform their normal filtering function. Under these conditions, the partly stripped scavenger gas may be blown from the container 15 into the common manifold of the battery for further purification by the operating separators, whereby the purified scavenger gas is ultimately received in the duct 9. A portion of the purified gas is preferably compressed to a pressure sufficient to overcome the pressure of the contaminated gas in the manifold, and the compressed purified gas employed as the scavenging gas.

The removal of fines from the layer 6 by upwardly flowing gas is greatly accelerated if the rake 11 is simultaneously moved slowly through the particulate material on the partition 18.

Figure 3:
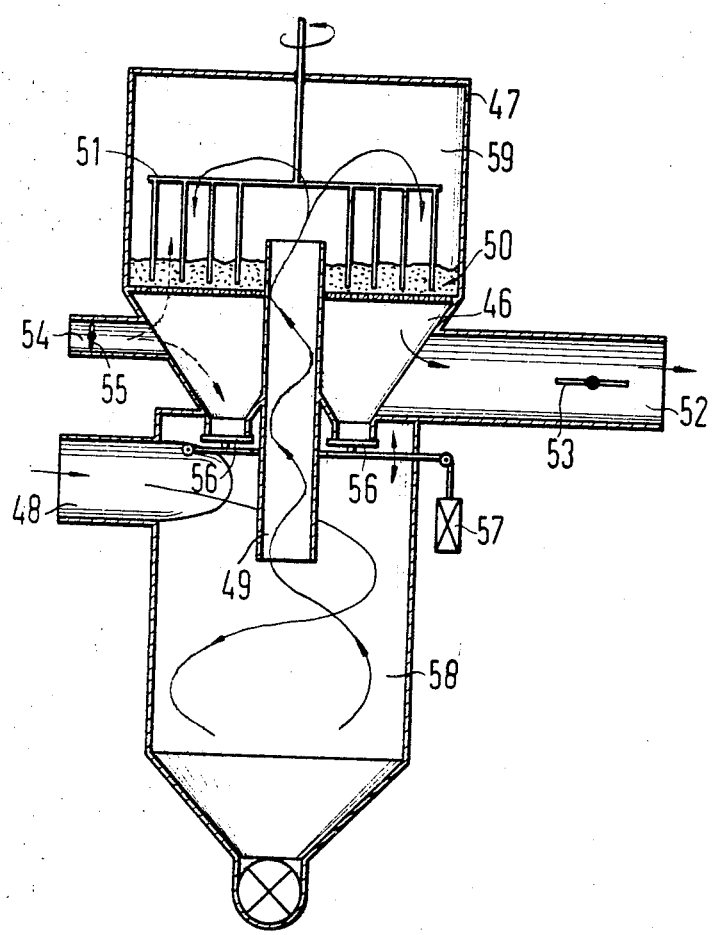
FIGS. 3, 4, and 5 show three modifications of the apparatus of FIGS. 1 and 2 in corresponding views.

In the modified separating apparatus shown in FIG. 3, the lower filter compartment 46 is the frustoconical bottom portion of a housing 47 whose cylindrical top compartment 59 is downwardly bounded by a filter 50 not significantly different from the filter 6, 18 described above, and equipped with a rotary rake 51 similar to the rake 11, and not shown in detail.

A wide low-pressure duct 52 and a narrower high-pressure duct 54 extend radially outward from the lower filter compartment 46 for release of a purified gas and admission of a compressed scavenging gas respectively, and are provided with individual butterfly valves 53, 55.

The housing 47 is mounted coaxially atop the cylindrical portion of a cyclone container 58 to which the contaminated gas is admitted tangentially through an inlet pipe 48. The spiraling, partly stripped gas rises from the container 58 to the upper filter compartment 59 through a straight, vertical, coaxial conduit 49, as described above.

The bottom wall of the lower filter compartment 46 partly forms the top wall of the container 58. It is apertured, and the apertures are normally closed by trap doors 56 which may be swung open by a hydraulic motor 57. The doors 56 and the valve 55 in the high-pressure duct 54 are closed during normal operation of the separator shown in FIG. 3, and contaminated gas is normally admitted through the inlet pipe 48, while purified gas is discharged through the low-pressure duct 52, and solid particles are partly collected at the bottom of the container 58 and in the particulate material of the filter 50.

When it is desired to remove fine particles from the filter 50, the valve 53 is closed, the valve 55 is opened, and the rake 51 is rotated. The fines are partly carried from the filter 50 through the conduit 49 into the container 58. The illustrated arrangement, moreover, permits the particle layer of the filter 50 to be stirred very intensively by the rake 51 so that the fine particles are uniformly distributed in the original filter medium and partly drop through the openings in the supporting member of the filter 50 into the lower compartment 46 where they accumulate on the trap doors 56, and may be dropped into the container 58 by opening the doors. Very rapid purification of the filter 50 may thus be achieved.

Figure 4:
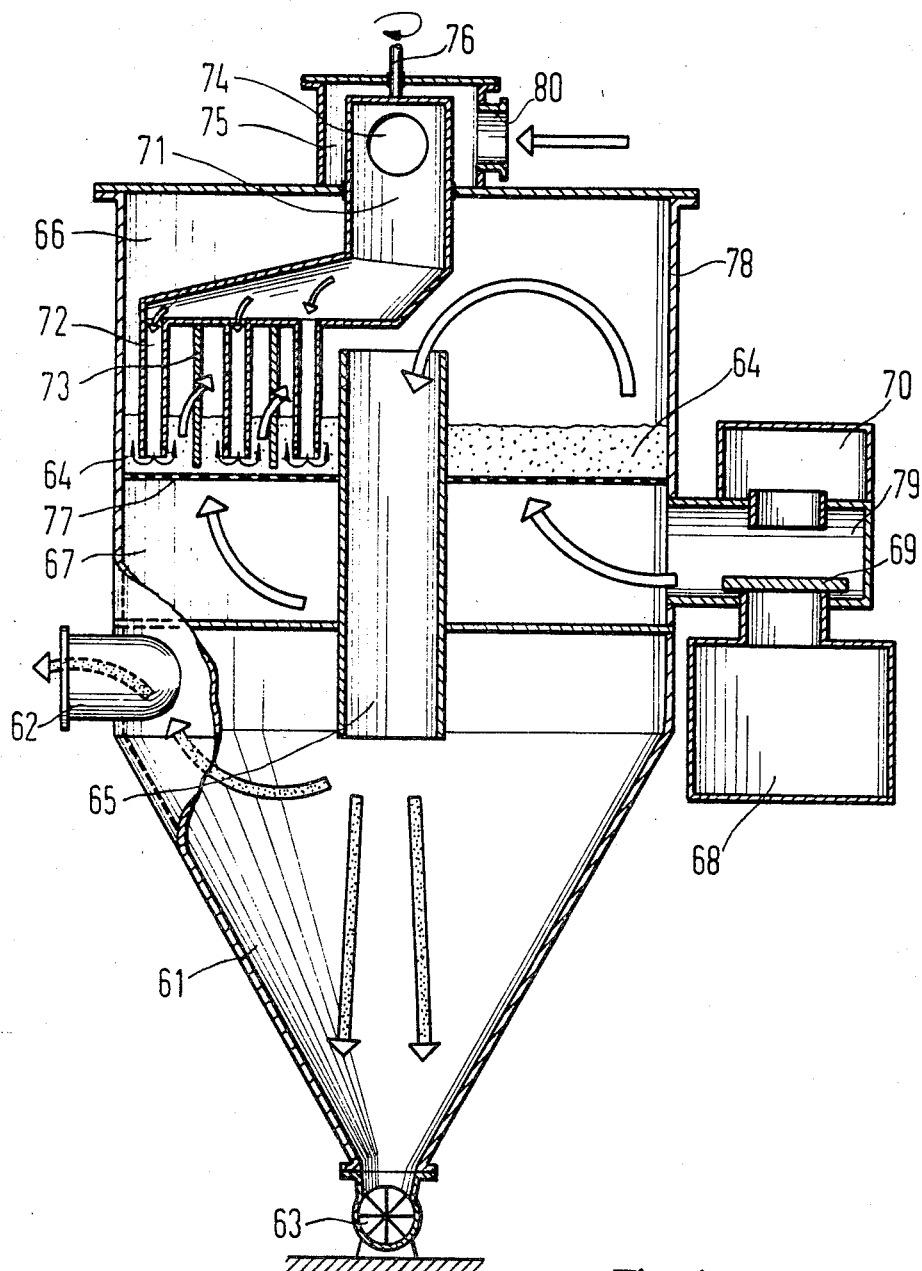

The apparatus shown in FIG. 4 is similar to that described above with reference to FIGS. 1 and 2, and operates in substantially the same manner. A shell 78 provides the container 61 of a cyclone collector and the upper and lower compartments 66, 67 of a filter chamber which are separated by a layer 64 of particulate material carried by a foraminous supporting member 77.

A contaminated gas admitted in a tangential direction into the container 61 through an inlet pipe 62 is partly stripped of solid particles by centrifugal force, and the coarse, solid particles are discharged by a screw conveyor 63. The partly purified gas rises through a vertical cylindrical conduit 65 into the upper filter compartment 66, and the purified gas is released from the lower compartment 67 through a discharge port 79 into a duct 68 when the duct is opened by a valve 69.

In the regenerating condition of the apparatus illustrated in FIG. 4, the valve 69 closes the duct 68 and admits compressed scavenging gas from another duct 70. The scavenging gas passes upward through the layer 64 and is ultimately released from the container 61 by the inlet pipe 62, as described in more detail above.

The apparatus of FIG. 4 differs from the embodiments described so far by the rake employed for mixing, smoothing, and classifying the layer 64. The rake has an approximately L-shaped hollow arm 71 whose radial or horizontal portion carries hollow spikes 72 in addition to solid wire prongs 73. The spikes 72 are as long as the prongs 73 and terminate well below the exposed surface of the layer 64 in nozzles open in a tangential or circumferential direction relative to the axis of the apparatus.

The upright or axial portion of the arm 71 is journaled in the top wall of the shell 78 and axially secured in a nonillustrated manner. Its upper end is spacedly enveloped by a casing 75 sealed to the top wall of the shell 78 and communicates with the interior of the casing 75 through an opening 74. A nipple 80 connects the casing 75 with a compressor through nonillustrated control valves. The output shaft 76 of a nonillustrated motor enters the casing 75 and is attached to the arm 71 for turning the same about the axis of the shell 78.

While the arm 71 is driven to draw the spikes 72 and the prongs 73 through the particulate material of the layer 64, gas under pressure is admitted to the casing 75, and the gas is discharged in respective jets from the nozzles of the spikes 72, thereby accelerating the separation of fines from the layer 64 during regeneration of the latter. The several rakes illustrated also are effective in smoothing the exposed surfaces of the layers 6, 50, 64 and of maintaining uniform thickness in the same.

Figure 5:
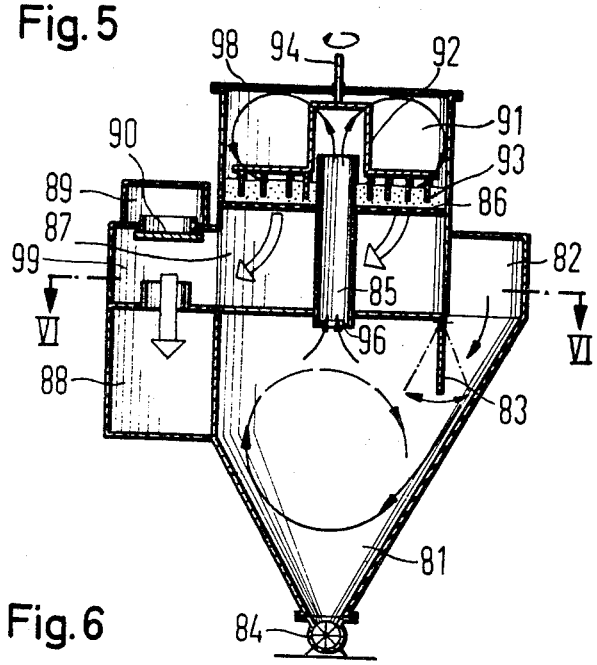
Figure 6:
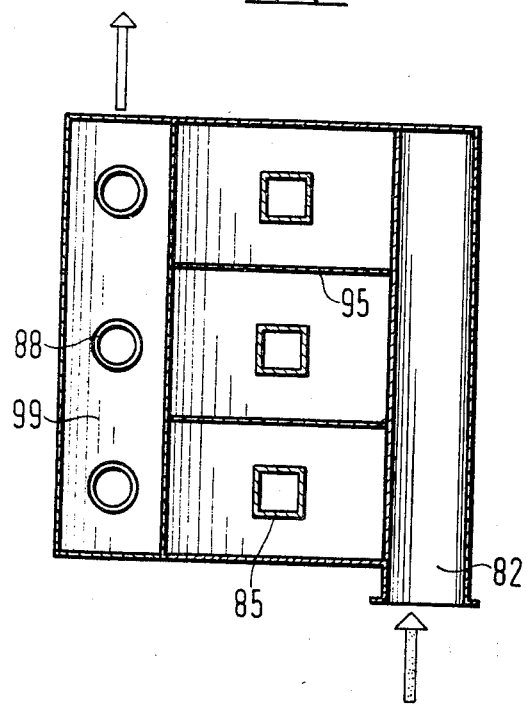
FIG. 6 illustrates the apparatus of FIG. 5 in plan section on the line VI—VI.

The separating apparatus of the invention shown in FIGS. 5 and 6 mainly differs from the devices described above by the angular configuration of containers, chambers, and conduits which are of circular cross section in the aforedescribed embodiments.

The shells 98 of the three separating units in the battery illustrated in FIGS. 5 and 6 are made of flat sheet metal and are separated from each other by parallel flat walls 95 common to two adjacent shells 98. The cyclone container 81 of each shell has the shape of a downwardly tapering wedge, and the narrow bottom ends of the several cyclone containers 81 communicate with a common screw conveyor 84. Each container receives contaminated gas from a common inlet manifold 82 through an inlet port bounded by one of the obliquely sloping fixed walls of the container 81 and by a rectangular flap 83 hinged to the top wall of the container and pivotally adjustable about a horizontal axis in a nonillustrated conventional manner to control the flow section of the inlet port, as indicated by a curved double arrow.

The container 81 is connected with the upper compartment 91 of a directly superimposed filter chamber by a square vertical conduit 85 which passes through the top wall of the container 81, the lower filter compartment 87, and the filter 86, substantially as described above, the upper orifice of the conduit 85 being sufficiently above the exposed surface of the filter 86 to prevent the latter from being disturbed by the gas stream discharged near the top wall of the upper compartment 91.

A rake is mounted on the top wall of the compartment 91 by means of the vertical output shaft 94 of an electric motor, not itself shown, and consists mainly of a carrier bar 92 which extends in two opposite radial directions from the shaft 94 and carries axially elongated prongs 93.

In the illustrated position of a lift valve 90, purified gas released from the underside of the filter 86 into the lower filter compartment 87 passes through a discharge port 99 into a duct 88 common to the three separators seen in FIG. 6. In the nonillustrated regenerating position of the valve 90, a compresses scavenging gas is admitted from a duct 89 into the port 99 and the lower compartment 87 to blow fine particles from the filter 86 into the container 81 while the scavenging gas, at least partly stripped of solid particles, is mixed with the contaminated raw gas in the manifold 82.

Because of the configuration of the walls of the container 81 which converge toward the screw conveyor 84, the contaminated gas admitted to the container along one of the converging walls is deflected by the other converging wall into a vortex having a horizontal axis. This rotary movement of the gas cannot be usefully propagated through the conduit 85 into the upper filter compartment 91, and the conduit is therefore dimensioned, shaped, and equipped to favor longitudinal gas flow with a minimum of turbulence.

A frustoconical baffle 96 arranged at the lower orifice of the conduit 85 in the container 81 is positioned to deflect the entering gas from a horizontal into a vertical direction, and the gas discharged axially from the top orifice of the conduit 85 toward the transverse top wall of the compartment 91 is deflected by the latter into an approximately toroidal flow pattern not significantly affected by the rectangular shape of the compartment, when viewed from above. The principal flow of gas in the compartment 91 is indicated in FIG. 5 by arrows, and the acute angle at which the gas impinges on the filter 86 while flowing substantially in radial planes about the longitudinal axis of the conduit 85 is evident.

During operation of the battery of separating units shown in FIGS. 5 and 6, the valve 90 usually assumes the position seen in FIG. 5 in all three units, as is evident from FIG. 6. The time required for regenerating the filter 86 is much shorter than the period during which enough solid particles are caught on the filter to require regeneration.

It is a common feature of the several illustrated embodiments of the invention that the filters have exposed surfaces that are smaller by the cross section of the associated vertical conduits than the greatest horizontal cross section of the associated cyclone containers, and not greater than the cross section of the vortex in the cyclone container. Yet, the devices of the invention have been operated successfully at high flow rates in numerous industrial plants. Because of the oblique angle at which the entrained solid particles meet the exposed surfaces of the filters, the depth of the filters can be made very small. Their effective filtering depth is greater than the depth measured at right angles to the exposed surface, and almost equal to the depth as measured in the direction of incidence of the solid particles.

The permeability of the filters to the carrier gas, however, is determined almost exclusively by the actual filter depth at right angles to the exposed surface, and can be held very small in the apparatus of the invention, a particulate layer having a depth of 5 cm. being typical in industrial equipment of the invention. If the direction of gas flow were reversed under otherwise similar conditions, the filtering layer would have to be made 15 cm. deep. The flow resistance of the straight conduits which connect the cyclone containers to the filter compartments is minimal, and the cyclone collectors in the apparatus of the invention can be operated at very low inlet pressure. The back pressure due to the connecting conduits and the filters is very small with all practical filter media.

Sand has been mentioned as an example of a filter medium, but the invention is not limited to specific particulate materials used in the filters, and actually is not limited to particulate filter media, although particulate filter media are preferred because of their low cost and operating advantages evident from the preceding description of preferred embodiments. Sintered, porous metal and ceramic plates have been used successfully in the apparatus of the invention and may be used where their greater cost is justified. The particle size of the particulate filter material or the pore size of a sintered filter plate will readily be selected by those skilled in the art to suit specific operating conditions.

It will be appreciated that many specific features of the several embodiments described and illustrated are interchangeable. The square or rectangular conduit 85 seen in FIG. 6 thus may be used with or without the baffle 96 in the embodiments of the invention shown in FIGS. 1 to 4, and the rectangular containers and compartments illustrated in FIGS. 5 and 6 may be replaced by equivalent elements having cylindrical, conical, or otherwise arcuately curved walls, while at least some of the cylindrical or conical walls shown in FIGS. 1 to 4 may be replaced by flat, angularly connected walls in an obvious manner. Such permutations and variations of disclosed features will be obvious to those skilled in the art and are specifically contemplated.

What we claim is:

1. In an apparatus for separating suspended solid particles from a carrier gas, in combination:
   a. centrifugal separator means for separating relatively coarse solid particles from said carrier gas, and for collecting the separated particles, said separator means including
      1. a container of circular cross section about an upright axis, said container having a top wall,
      2. inlet means on said container for admitting a stream of said carrier gas having said solid particles suspended therein to said container and directing said stream tangentially into said container relative to said axis, whereby the admitted gas moves in a vortex about said axis, and
      3. discharge means for discharging accumulated solid particles from said container;
   b. a housing including side and top walls superimposed on said container and defining a filter chamber therein;
   c. a plate member extending horizontally across said chamber and dividing the same into an upper compartment and a lower compartment;
   d. a gas port leading outward from said lower compartment;
   e. filter means for removing relatively fine solid particles from said carrier gas,
      1. said filter means including a layer of particulate filter material carried on said plate member and having an exposed substantially horizontal, upper face in said upper compartment,
      2. said plate member being formed with openings connecting said compartments for flow of fluid therebetween and of a size to retain said particulate filter material;

f. a conduit extending from said container through said lower compartment, said plate member and said layer in engagement with the top wall of said container and said plate member, said conduit having
   1. an axis substantially coinciding with said axis of said container, and
   2. two axially terminal orifices in said container and upwardly spaced from said exposed face in said upper compartment respectively; and
g. rake means in said upper compartment for raking said layer, said rake means including
   1. a plurality of elongated agitating members, and
   2. drive means for moving said agitating members in a circular, horizontal path while said agitating members extend downwardly into said layer through said exposed upper face of said layer.

2. In an apparatus as set forth in claim 1, said exposed surface being not greater than the greatest cross section of said container at right angles to the axis of said vortex.

3. In an apparatus as set forth in claim 2, said conduit being of substantially circular cross section.

4. In an apparatus as set forth in claim 1, the orifice of said conduit in said container being downwardly spaced from said top wall of the container.

5. In an apparatus as set forth in claim 4, said conduit having an upright axis, baffle means in said upper compartment for deflecting a stream of gas discharged from the orifice of said conduit in said upper compartment into a substantially toroidal path centered in said upright axis.

6. In an apparatus as set forth in claim 4, said top wall of the container constituting a bottom wall of said lower compartment.

7. In an apparatus as set forth in claim 4, said inlet means defining an entry port for said stream into said container, said entry port being upwardly spaced from the orifice of said conduit, in said container.

8. In an apparatus as set forth in claim 1, a plurality of nozzles, supply means for supplying a gas under pressure to said nozzles, and mounting means mounting said nozzles on said housing for discharge of said gas under pressure against said layer, and connecting the nozzles to said drive means for movement thereby in said path.

9. In an apparatus as set forth in claim 8, said nozzles having respective orifices intermediate said exposed surface and said plate member.

10. In an apparatus as set forth in claim 1, scavenging means for admitting a scavenging gas under pressure to said lower compartment while no carrier gas is being admitted to said container, and while said agitating members are moved in said path thereof by said drive means.

11. In an apparatus as set forth in claim 1, two ducts, and valve means operatively interposed between said ducts and said gas port and operable to connect each of said ducts to said port while simultaneously closing the other duct, one of said ducts when connected to said gas port by said valve means constituting said scavenging means.

12. In an apparatus as set forth in claim 11, said valve means including two coaxial, axially spaced valve seats on said ducts respectively, a valve disc, and moving means for moving said valve disc between two positions in which the disc sealingly engages said valve seats respectively.